US005435811A

United States Patent [19]

Fey et al.

[11] Patent Number: 5,435,811

[45] Date of Patent: Jul. 25, 1995

[54] MIDDLE DISTILLATE HYDROCARBON FOAM CONTROL AGENTS FROM ALKYMETHYLSILOXANES

[75] Inventors: Kenneth C. Fey, Midland; Christopher S. Combs, Saginaw, both of Mich.

[73] Assignee: Dow Corning Corporation, Midland, Mich.

[21] Appl. No.: 155,397

[22] Filed: Nov. 19, 1993

[51] Int. Cl.$^6$ .......................... C10L 1/28; B01D 17/00

[52] U.S. Cl. .................................... 44/320; 252/321; 252/351; 252/358

[58] Field of Search ................. 44/320; 252/8.05, 351, 252/321, 358

[56] References Cited

U.S. PATENT DOCUMENTS

| | | | |
|---|---|---|---|
| 2,862,885 | 12/1958 | Nelsen et al. | 252/49.6 |
| 2,917,480 | 12/1959 | Bailey et al. | 260/42 |
| 2,992,083 | 7/1961 | Bluestein et al. | 44/72 |
| 3,057,901 | 10/1962 | Plueddemann | 260/448.2 |
| 3,233,986 | 2/1966 | Morehouse et al. | 44/76 |
| 3,442,631 | 5/1969 | Gluckstein | 44/320 |
| 3,764,282 | 10/1973 | Furlong et al. | 44/320 |
| 4,449,415 | 5/1984 | Groenhof | 74/214 |
| 4,690,688 | 9/1987 | Adams et al. | 44/76 |
| 4,844,826 | 4/1989 | Schaefer et al. | 252/49.6 |
| 4,853,474 | 8/1989 | Bahr et al. | 556/445 |
| 5,017,221 | 5/1991 | Legrow et al. | 106/2 |
| 5,160,494 | 11/1992 | Krzysik et al. | 512/3 |
| 5,192,336 | 3/1993 | Grewal | 44/418 |

OTHER PUBLICATIONS

Gelius, Rolf et al. "Poly-n-Alkylmethylsiloxanes: Effective Cloud Point and Pour Point Depressants for Petroleum Distillates" *J. Prakt. Chem.* 318(1), 96–104, 1976 no month available.

*Primary Examiner*—Prince Willis, Jr.
*Assistant Examiner*—Cephia D. Toomer
*Attorney, Agent, or Firm*—Richard I. Gearhart

[57] ABSTRACT

Organosilicone materials that are "density-matched" to the hydrocarbon medium also act as defoamers in hydrocarbon fuel, specifically as described herein for diesel fuel. Specifically these new defoamers can be described as alkylmethylsiloxanes. They have the characteristics of being slightly soluble or insoluble in water and hydrocarbon fuels. By changing the solvent and the method of dispersion, different particle size distributions are obtained.

14 Claims, No Drawings

MIDDLE DISTILLATE HYDROCARBON FOAM CONTROL AGENTS FROM ALKYMETHYLSILOXANES

FIELD OF THE INVENTION

This invention relates to foam control and is particularly concerned with controlling foaming in hydrocarbon liquids.

BACKGROUND OF THE INVENTION

There are a number of patents which disclose specific compositions which reduce or eliminate foam. For example, U.S. Pat. No. 5,192,336 assigned to Nalco, discloses that bisstrearamides act as defoamers by remaining dispersed within the fuel. This is in contrast to silicone polyether defoamers, as claimed in U.S. Pat. No. 4,690,668 assigned to Dow Corning and in U.S. Pat. No. 3,233,986 assigned to Union Carbide, which because of their higher density relative to hydrocarbon fuel settle out of the fuel over time, potentially rendering them less effective without periodic agitation to re-disperse them. Silicone polyethers also can suffer from the fact that they tend to be more soluble or dispersible in water, a constant component of hydrocarbon fuels. In storage tanks, water tends to coalesce, forming a layer at the bottom of the tank. As the silicone polyether settles due to gravity and its insolubility in the hydrocarbon, eventual contact with the water layer can result in its being absorbed into that phase, thus irreversibly removing it from the fuel entirely.

Current middle distillate fuels exhibit foaming during transfer operations, such as filling a vehicle's fuel tank at a filling station. In the processing, transportation and storage of hydrocarbon liquids, it is frequently observed that foaming occurs as the liquid is passed from one vessel to another. For example, as liquid hydrocarbon fuel is passed quickly into a storage tank a foam may develop at the surface of the fuel and, in many cases, the extent of foaming is sufficiently significant and persistent to require a reduction in the rate of passage of the liquid fuel into the vessel. It is highly desirable to provide means for controlling foaming so as to permit high rates of passage.

Various proposals have been made for controlling foaming of various grades of hydrocarbon liquids by use of additives for example silicone products. However, the reduction of foaming of diesel fuels by use, in extremely small quantities, of technically acceptable silicone additives has not been satisfactorily solved prior to this invention.

U.S. Pat. No. 3,233,986 is concerned with siloxane polyoxyalkylene block copolymers as antifoam agents and discloses the use of a wide variety of such copolymers to reduce the tendency of organic liquids to foam. Organic liquids mentioned in said specification include inter alia various hydrocarbon liquids including liquid hydrocarbon fuels, e.g., kerosene, gasoline and diesel fuel. Among the many copolymers advocated in said specification are those comprising groups represented by the formula:

$$G^3(OG'')_nOG'\overset{G_c}{\overset{|}{Si}}O_{\frac{3-c}{2}}$$

wherein $G^3$ is a member selected from the group consisting of the hydrogen atom and the monovalent hydrocarbon groups, G″ is an alkylene radical containing at least two carbon atoms, G′ is a divalent hydrocarbon radical, G is a monovalent hydrocarbon radical, n has a value of at least two and c has a value from 0 to 2 inclusive.

U.S. Pat. No. 3,233,986 teaches that at least 60% by weight of the groups OG″ must be oxyethylene or oxypropylene groups and that other oxyalkylene groups may be present in the groups OG″. It is said that each oxyalkylene block preferably contains from four to thirty groups OG″. The specification teaches that the number of oxyalkylene groups (OG″) and that part of the average molecular weight of the copolymer that is attributable to the oxyalkylene blocks is not critical, and that useful copolymers can contain siloxane blocks and oxyalkylene blocks in any relative amount.

U.S. Pat. No. 3,233,986 states that the amount of the copolymers used with a liquid hydrocarbon is not critical and can range from 5 to 2000 parts by weight of the copolymer per million parts of the liquid.

Some copolymers of the type disclosed in U.S. Pat. No. 3,233,986 when employed in certain hydrocarbon fuels, particularly when used in amounts of less than 100 parts copolymer per million parts hydrocarbon, do not act to reduce the tendency of the hydrocarbon to foam but rather to increase the tendency of the hydrocarbon to foam.

SUMMARY OF THE INVENTION

This invention discloses that organosilicone materials that are "density-matched" to the hydrocarbon medium also act as defoamers in hydrocarbon fuel, specifically as described herein for diesel fuel. Specifically these new defoamers can be described as alkylmethylsiloxanes. They have the characteristics of being slightly soluble or insoluble in water and hydrocarbon fuels. By changing the solvent and the method of dispersion, different particle size distributions of alkylmethylsiloxane are obtained.

By using materials that do not readily settle from the hydrocarbon, and which are sparingly soluble or only dispersible in water, these defoamers do not lose their defoaming capability during storage as readily as conventional silicone polyethers which rapidly settle from the fuel and which are more soluble in water.

The present invention is directed to novel formulations to reduce the tendency of hydrocarbon liquids to foam. The novelty resides in the inclusion of alkylmethylsiloxane mixtures comprising an alkylmethylsiloxane of the structure $R'Me_2SiO(Me_2SiO)_x(MeRSiO)_ySiMe_2R'$, or $R'Me_2SiO(MeRSiO)_ySiMe_2R'$ wherein R is the same or different alkyl of 2 to 100 carbon atoms, R′ is methyl or R, x is 1–499, $y \geqq 1$ and $x+y \leqq 500$. The invention may also comprise mixtures of the aforesaid compositions.

The present invention is also directed to a method of treating hydrocarbon liquids, such as diesel fuel and jet fuel, to reduce the tendencies of the hydrocarbon liquid to foam.

PREFERRED EMBODIMENT OF THE INVENTION

While the invention is susceptible of embodiment in many different forms there is described herein in detail preferred and alternate embodiments of the invention. It should be understood, however, that the present disclosure is to be considered an exemplification of the principles of the invention and is not intended to limit the spirit and scope of the invention and/or claims of the embodiments illustrated.

The present invention comprises adding density matched alkylmethylsiloxanes to hydrocarbon liquid to reduce the tendency of the hydrocarbon liquid to produce foam. These polymers have the characteristics of being slightly soluble or insoluble in water and hydrocarbon fuels. By changing the solvent and the method of dispersion, different particle size distributions of the alkylmethylsiloxanes are obtained.

By using materials that do not readily settle from the hydrocarbon due to gravity, and which are sparingly soluble or only dispersible in water, these defoamers do not lose their defoaming capability during storage as readily as conventional silicone polyethers which rapidly settle from the fuel and which are more soluble in water.

Hydrocarbon fuels of particular interest in the context of the present invention are diesel fuel and jet fuel. The hydrocarbon fuel is preferably a diesel fuel used as a fuel for motor vehicles, e.g. cars and heavy goods vehicles, and marine use, or a jet fuel. The expression "diesel fuel" where used herein is meant. gas oil and fuel oil including those materials which are referred to as light domestic and heating oils and diesel fuel and irrespective of whether they are intended for vehicular, marine, heating or other use. These materials are loosely characterized as having a viscosity of not more than 115 " Redwood 1 at 38° C. and a boiling point in the range of about 200° C. to about 380° C. Particularly embraced within the expression are those hydrocarbon liquids having a viscosity of about 30 to 40" Redwood at 38° C., including those having a viscosity at 20° C. in the range of about 2.9 to about 10.2 centistokes, and at 38° C. in the range of about 1.6 to about 6.0 cS. Further, these materials have a carbon residue (Conradson) of $<0.2\%$ by weight, a water content of $<0.05\%$ by weight, a sulphur content. of $<1.0\%$ by weight and a net calorific value of about 10100 to about 10300 Kcal/Kg.

The expression "jet fuel" where used herein is meant kerosene, light oils and medium oils for example that known as AVTUR fuel. AVTUR fuel is a medium oil distilling between 150° and 300° C. that distills at least 65% in volume at 250°., has a flash point above 38° C., has a maximum aromatic content of 20% by volume, has been treated to have a kinematic viscosity of less than 15 Cst ($1.5\times10-5$ $m^2$/ s) at $-34°$ C. and has a freezing point not greater and $-50°$ C.

The present invention may also find use at least to a limited extent for controlling foaming of other hydrocarbon liquids, for example residual fuel oils having a viscosity at 38 d C. of greater than 115" Redwood 1, light medium and heavy naphtha, vaporizing oils and motor oils and motor spirits. The invention is particularly beneficial in the control of foaming of hydrocarbon liquids and especially diesel fuels as they are pumped rapidly from one vessel to another in the presence of air, and possibly in the presence of water. Such circumstances may occur for example during transfer of materials though a supply pipe from one vessel to another, as required during separation of various grades of hydrocarbon liquids from crude oil or separation of various grades of hydrocarbon liquid from selected feedstocks, and in transfer of hydrocarbon liquids from road tankers to static storage tanks.

Frequently hydrocarbon liquids have disposed therein various "additive packages". The additive packages contain corrosion inhibitors, anti-scaling agents, octane improvers, emulsifiers, detergents, etc., to improve overall engine performance. The types and quantities of these additives are well known to those skilled in the art.

The polymers of the present invention may be used in a method according to the invention in any desired quantity and incorporated into the hydrocarbon liquid in any suitable manner. The copolymers are added to the hydrocarbon liquid in the form of a solution or dispersion. The preferred polymers are effective to reduce the tendency of hydrocarbon liquids to foam when used in quantities of 100 parts per million or less, for example in the range from about 1 to about 50 ppm by volume, the most preferred polymers being effective when used in quantities of from 1 to 29.

The invention also include alkylmethylsiloxanes selected from the group consisting essentially of: $R'Me_2SiO(Me_2SiO)_x(MeRSiO)_ySiMe_2R'$ and $R'Me_2SiO(MeRSiO)_ySiMe_2R'$, wherein x is 1-499, $y \geq 1$, with $x + y \leq 500$, R is the same or different alkyl group of 2-100 carbon atoms, preferably 24 to 28 carbon atoms and 30 to 50 carbon atoms, and R' is methyl or R. Exemplary alkylmethylsiloxanes which are useful herein include $Me_3SiO[Me(CH_3(CH_2)v)SiO]SiMe_3$, where v averages between 24 and 28, or Iv averages between 30 and 50.

The alkylmethylsiloxanes are density matched to the hydrocarbon liquid. By density matched, it is meant that the alkylmethylsiloxanes have a density roughly approximating the density of the hydrocarbon liquid. The density of most alkylmethylsiloxanes is with in the range of the described hydrogen liquids, generally 0.8 to 0.9 g/cm$^3$. By using materials that do not readily settle from the hydrocarbon and which are sparingly soluble or only dispersible in water, these defoamers do not lose their defoaming capability during storage as readily as conventional silicone polyethers which rapidly settle from the fuel and which are more soluble in water.

The above alkylmethylsiloxane are known in the art and can be produced by known methods. For example, cyclic alkylmethylsiloxane polymers can be produced by the reaction of a cyclic siloxane having Si-H functional units thereon (e.g., $[MeHSiO]_2$) with a slight stoichiometric excess of an alkene in the presence of a platinum on carbon catalyst. Likewise, linear alkylmethyl copolymers can be produced by the reaction of a linear siloxane having Si-H functionality in the chain such as $(Me_3SiO_{0.5})_2(MeHSiO)_{z1}$, in which zl is about 4-100, and a cyclic siloxane having $(Me_2SiO)_{z2}$ units, in which z2 is 3-6. The reaction product (generally about 10% cyclic and 90 % linear) is then contacted with a slight stoichiometric excess of an alkene in the presence of a platinum on carbon catalyst.

Batch production of the alkylmethylsiloxanes is conducted by adding the reaction product to a non-agitated suspension of the catalyst in the alkene at about sixty degrees Centigrade. Continuous production of the alkylmethylsiloxanes is conducted by pumping a preheated solution of a stoichiometric excess of an alkene $CH_2{=}CHR$ and the reaction product through a packed column containing platinum on carbon catalyst chips. The column will require provision for the removal of heat because of the exothermic nature of the reaction.

For antifoam applications, the preferred alkylmethylsiloxanes include $Me_3SiO[Me(CH_3(CH_2)v)SiO]SiMe_3$, where v averages between 24 and 28, or v averages between 30 and 50. This antifoaming agent may be added directly to the hydrocarbon fuel, or may be predispersed in a predispersent, such as the hydrocarbon liquid, xylene, toluene, naphtha, or other aromatics, various ketones, ethers and other commonly used organic solvents.

EXAMPLE

Four samples were prepared. For Sample A, 90 gm. of diesel fuel was weighed into a 16 oz. glass bottle. To this is added 10 ppm of $Me_3SiO[Me(CH_3(CH_2)v)SiO]SiMe_3$, where v averages between 30 and 50 (the "first antifoam agent"), predispersed as a 1%wt. solution in xylene. For Sample B, 90 gm. of diesel fuel was weighed into a 16 oz. glass bottle, and to this is added 10 ppm of the first antifoam agent, predispersed as a 1% wt. solution in diesel fuel.

For Sample C, 90 gm. of diesel fuel was weighed into a 6 oz. glass bottle. To this is added 10 ppm of $Me_3SiO[Me\ (CH_3\ (CH_2)_v)SiO]SiMe_3$, where v averages between 24 and 28 (the "second antifoam agent"), predispersed as a 1% wt. solution in xylene. For Sample D, 90 gm. of diesel fuel was weighed into a 16 oz. glass bottle, and to this is added 10 ppm of the first antifoam agent, predispersed as a 1% wt. solution in diesel fuel.

The mixtures were then gently swirled to disperse the antifoam solution. Then 10 gm. of DI water was added to each bottle, and the contents of each were again gently swirled to allow for some limited contact between phases.

50 cc. of the fuel phase from each of the above samples were pipetted into separate 100 cc. graduated cylinders. The cylinders were then stopped with a glass stopper and the contents shaken 60–65 times during a one minute period. After the foam shaking had stopped, the foam volume was immediately recorded and the amount of time required for the foam to break and expose a clear section of liquid was measured. The foam height was then converted to a "Percent Foam Volume" using the following formula, which is relative to the original liquid volume of 50 cc.:

100×{(recorded foam volume−50)cc/50 cc}="Percent Foam Volume"

Table I below shows the results of the trials:

TABLE I

| | DAY 1 | | DAY 7 | |
|---|---|---|---|---|
| | % Foam Volume | Break Time | % Foam Volume | Break Time |
| Sample A | +18% | 23 sec. | +23% | 31 sec. |
| Sample B | +18% | 25 sec. | +21% | 34 sec. |
| Sample C | +26% | 60 sec. | +19% | 43 sec. |
| Sample D | +28% | 57 sec. | +21% | 49 sec. |
| Control (No Antifoam) | +27% | 57 sec. | +25% | 47 sec. |

The table shows that the first antifoam additive of Samples A and B reduce the break time by as much as 50% over untreated diesel fuel. Samples A and B showed a significant decrease in overall foam volume when compared to the control, which had no anti-foam additives. Samples C and D also showed improvement over the control groups.

The foregoing specification describes only the preferred embodiment and the alternate embodiments of the invention. Other embodiments may be articulated as well. It is expected that others will perceive differences which while differing from the foregoing, do not depart from the spirit and scope of the invention herein described and claimed.

We claim:

1. The composition consisting essentially of:
a hydrocarbon fuel; and
a density matched alkylmethylsiloxane having the formula $R'Me_2SiO(Me_2SiO)_x(MeRSiO)_ySiMe_2R'$ wherein x is 1–499, y≧1, with x+y≦500, R is the same or different alkyl group of 2–100 carbon atoms, and R' is methyl or R, wherein said density matched alkylmethylsiloxane is present in an amount less than 100 parts per million by volume of hydrocarbon liquid.

2. The composition of claim 1, wherein y=1, R' is methyl, and R is the same or different alkyl groups of between 30 and 50 carbon atoms.

3. The composition of claim 1, wherein y=1, R' is methyl, and R is the same of different alkyl groups of between 24 and 28 carbon atoms.

4. The composition of claim 1, in which said hydrocarbon fuel includes an additive package.

5. The composition of claim 1, in which said hydrocarbon fuel is diesel fuel.

6. The composition of claim 1, in which said hydrocarbon fuel is jet fuel.

7. A method for reducing the amount of foam in a hydrocarbon liquid, comprising the step of:
adding to a hydrocarbon fuel a density matched alkylmethylsiloxane having the formula $R'Me_2SiO(Me_2SiO)_x(MeRSiO)_ySiMe_2R'$ wherein x is 1–499, y≧1, with x+y≦500, R is the same or different alkyl group of 2–100 carbon atoms, and R' is methyl or R.

8. The method of claim 7, wherein y=1, R' is methyl, and R is the same or different alkyl groups of between 30 and 50 carbon atoms.

9. The method of claim 7, wherein y=1, R' is methyl, and R is the same or different alkyl groups of between 24 and 28 carbon atoms.

10. The method of claim 7, in which said hydrocarbon liquid includes an additive package.

11. The method of claim 7, in which said hydrocarbon liquid is diesel fluid.

12. The method of claim 7, in which said hydrocarbon liquid is jet fuel.

13. The method of claim 7, wherein said alkylmethylsiloxane is dispersed in a dispersant prior to said addition to said hydrocarbon liquid.

14. The method of claim 13, wherein said alkylmethylsiloxaner is dispersed in a dispersent selected from the group consisting of:
a) hydrocarbon liquid;
b) xylene;
c) toluene;
d) ketones;
e) esters; or
f) ethers.

* * * * *